(12) United States Patent
Wang et al.

(10) Patent No.: US 11,954,291 B2
(45) Date of Patent: Apr. 9, 2024

(54) TOUCH PANEL AND MANUFACTURING METHOD THEREOF, AND DISPLAY DEVICE

(71) Applicants: Chongqing BOE Display Technology Co., Ltd., Chongqing (CN); BOE Technology Group Co., Ltd., Beijing (CN)

(72) Inventors: Lingfei Wang, Beijing (CN); Tianlong Zhao, Beijing (CN); Dawei Shi, Beijing (CN)

(73) Assignees: Chongqing BOE Display Technology Co., Ltd., Chongqing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/781,198

(22) PCT Filed: Jan. 6, 2021

(86) PCT No.: PCT/CN2021/070466
§ 371 (c)(1),
(2) Date: May 31, 2022

(87) PCT Pub. No.: WO2021/143596
PCT Pub. Date: Jul. 22, 2021

(65) Prior Publication Data
US 2023/0004244 A1 Jan. 5, 2023

(30) Foreign Application Priority Data
Jan. 15, 2020 (CN) .......................... 202010042460.6

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04103* (2013.01); *G06F 2203/04111* (2013.01)

(58) Field of Classification Search
CPC .................. G06F 3/044; G06F 3/0412; G06F 2203/04103; G06F 2203/04111
See application file for complete search history.

(56) References Cited

U.S. PATENT DOCUMENTS 11,500,498 B2 * 11/2022 Kang ..................... G06F 3/0446
2004/0043638 A1 3/2004 Nansei et al.
(Continued)

FOREIGN PATENT DOCUMENTS

| CN | 1485891 A | 3/2004 |
| CN | 104218094 A | 12/2014 |

(Continued)

OTHER PUBLICATIONS

CN202010042460.6 first office action.
(Continued)

Primary Examiner — Peter D Mcloone
(74) Attorney, Agent, or Firm — IPro, PLLC

(57) ABSTRACT

A touch panel and a manufacturing method thereof, and a display device. An insulation layer (4) positioned between a substrate (1) and a polarizer (3) is configured to comprise a silicon nitride layer (41) and a barrier layer (42) positioned at one side of the silicon nitride layer (41) away from the substrate (1). The barrier layer (42) can serve as a covering layer that stops an ammonia gas escaped from the silicon nitride layer (41) from moving to the polarizer (3) so as to prevent fading of the polarizer. The insulation layer (4) is configured to comprise two thin layers, namely a silicon nitride layer (41) and a barrier layer (42).

6 Claims, 6 Drawing Sheets

(56) References Cited

U.S. PATENT DOCUMENTS

| | | | |
|---|---|---|---|
| 2013/0313006 | A1 | 11/2013 | Ahn |
| 2016/0254287 | A1 | 9/2016 | Wang et al. |
| 2018/0314361 | A1 | 11/2018 | Chen et al. |
| 2018/0342699 | A1 | 11/2018 | Son et al. |
| 2019/0025637 | A1* | 1/2019 | Lu .................. G02F 1/1368 |
| 2019/0043928 | A1 | 2/2019 | Hong et al. |
| 2019/0188469 | A1 | 6/2019 | Jin et al. |
| 2020/0411608 | A1 | 12/2020 | Tang et al. |
| 2021/0200381 | A1* | 7/2021 | Kang .................. G06F 3/0412 |
| 2021/0223656 | A1 | 7/2021 | Liu |
| 2021/0359263 | A1 | 11/2021 | Liu |

FOREIGN PATENT DOCUMENTS

| | | | |
|---|---|---|---|
| CN | 106339085 | A | 1/2017 |
| CN | 107293555 | A | 10/2017 |
| CN | 108803908 | A | 11/2018 |
| CN | 108807470 | A | 11/2018 |
| CN | 109283732 | A | 1/2019 |
| CN | 109817831 | A | 5/2019 |
| CN | 110286796 | A | 9/2019 |
| CN | 110349975 | A | 10/2019 |
| CN | 111258453 | A | 6/2020 |

OTHER PUBLICATIONS

CN202010042460.6 second office action.
CN202010042460.6 Decision of Rejection.
PCT/CN2021/070466 international search report.

* cited by examiner

TOUCH PANEL AND MANUFACTURING METHOD THEREOF, AND DISPLAY DEVICE

CROSS REFERENCE TO RELATED APPLICATIONS

The present disclosure is a National Stage of International Application No. PCT/CN2021/070466, filed on Jan. 6, 2021, which claims priority to Chinese Patent Application No. 202010042460.6, filed to China National Intellectual Property Administration on Jan. 15, 2020, the entire contents of which are incorporated herein by reference.

FIELD

The present disclosure relates to the field of touch control display technology, in particular to a touch panel and a manufacturing method thereof, and a display apparatus.

BACKGROUND

With the development of science and technology, smart devices such as mobile phones, tablet computers, digital cameras, and smart wearable products with touch control functions simplify human-computer interaction and bring high-quality user experience to users. There are four main types of touch screens, including resistive, capacitive, infrared and surface acoustic wave touch screens. Capacitive touch panels are widely used in electronic products due to their advantages of fast response time, good reliability and high durability.

SUMMARY

An embodiment of the present disclosure provides a touch panel, including: a substrate; a touch control structure, on the substrate; a polarizer, on a side of the touch control structure facing from the substrate; and an insulator layer, between the substrate and the polarizer. The insulator layer includes a silicon nitride layer and a blocking layer on a side of the silicon nitride layer away from the substrate.

Optionally, in the above touch panel provided by the embodiment of the present disclosure, the silicon nitride layer includes a first silicon nitride layer and a second silicon nitride layer. The blocking layer includes a first blocking layer on a side of the first silicon nitride layer away from the substrate and a second blocking layer on a side of the second silicon nitride layer away from the substrate.

Optionally, in the above touch panel provided by the embodiment of the present disclosure, the touch control structure includes a bridge layer and an electrode layer arranged in a laminated mode, and an interlayer insulator layer between the bridge layer and the electrode layer. The insulator layer includes the interlayer insulator layer, and the interlayer insulator layer includes the first silicon nitride layer and the first blocking layer which are arranged in contact with each other.

Optionally, in the above touch panel provided by the embodiment of the present disclosure, the first blocking layer is a first silicon oxide layer or a first compact silicon nitride layer.

Optionally, the above touch panel provided by the embodiment of the present disclosure further includes a barrier layer between the substrate and the touch control structure. The insulator layer includes the barrier layer, and the barrier layer includes the second silicon nitride layer and the second blocking layer which are arranged in contact with each other.

Optionally, in the above touch panel provided by the embodiment of the present disclosure, the second blocking layer is a second silicon oxide layer or a second compact silicon nitride layer.

Optionally, in the above touch panel provided by the embodiment of the present disclosure, a thickness of the first blocking layer occupies 10% to 15% of a thickness of the interlayer insulator layer.

Optionally, in the above touch panel provided by the embodiment of the present disclosure, a thickness of the second blocking layer occupies 10% to 15% of a thickness of the barrier layer.

Optionally, in the above touch panel provided by the embodiment of the present disclosure, the bridge layer includes a plurality of bridge electrodes, the electrode layer includes a plurality of touch control electrodes, and a part of the touch control electrodes are electrically connected with each other through the bridge electrodes.

Optionally, the above touch panel provided by the embodiment of the present disclosure further includes a protective layer between the touch control structure and the polarizer.

Correspondingly, an embodiment of the present disclosure further provides a display apparatus, including the touch panel according to any one of the above descriptions provided by the embodiment of the present disclosure.

Correspondingly, an embodiment of the present disclosure further provides a manufacturing method of a touch panel, including: forming, on a substrate, sequentially a touch control structure and a polarizer arranged in a laminated mode and an insulator layer arranged between the touch control structure and the polarizer. The forming the touch control structure includes forming a bridge layer and an electrode layer arranged in a laminated mode, and the forming the insulator layer includes forming a silicon nitride layer and a blocking layer on a side of the silicon nitride layer away from the substrate.

Optionally, in the above manufacturing method provided by the embodiment of the present disclosure, the forming the insulator layer includes: forming an interlayer insulator layer. The forming the interlayer insulator layer includes: depositing one silicon nitride layer on the bridge layer after forming the bridge layer and before forming the electrode layer, and forming a first silicon oxide layer on the surface of the silicon nitride layer by performing oxidation treatment on a surface of the silicon nitride layer by using oxygenated plasmas. A remaining part of the silicon nitride layer is used as a first silicon nitride layer, and the first silicon nitride layer and the first silicon oxide layer constitute the interlayer insulator layer. After forming the first silicon nitride layer and the first silicon oxide layer, the method further includes: forming a via hole for connecting the bridge layer and the electrode layer by patterning the first silicon nitride layer and the first silicon oxide layer.

Optionally, in the above manufacturing method provided by the embodiment of the present disclosure, the forming the insulator layer includes: forming an interlayer insulator layer. The forming the interlayer insulator layer includes: depositing one silicon nitride layer on the electrode layer after forming the electrode layer and before forming the bridge layer, and forming a first silicon oxide layer on the surface of the silicon nitride layer by performing oxidation treatment on a surface of the silicon nitride layer by using oxygenated plasmas. A remaining part of the silicon nitride layer is used as a first silicon nitride layer, and the first silicon nitride layer and the first silicon oxide layer constitute the interlayer insulator layer. After forming the first silicon nitride layer and the first silicon oxide layer, the method further includes: forming an interlayer insulator layer pattern for isolating the bridge layer and a part of touch control electrodes in the electrode layer by patterning the first silicon nitride layer and the first silicon oxide layer.

Optionally, in the above manufacturing method provided by the embodiment of the present disclosure, the forming the insulator layer includes: forming a barrier layer. The forming the barrier layer includes: depositing one silicon nitride layer on the substrate before forming the touch control structure, and forming a second silicon oxide layer on the surface of the silicon nitride layer by performing oxidation treatment on a surface of the silicon nitride layer by using oxygenated plasmas. A remaining part of the silicon nitride layer is used as a second silicon nitride layer, and the second silicon nitride layer and the second silicon oxide layer constitute the barrier layer.

Optionally, in the above manufacturing method provided by the embodiment of the present disclosure, the forming the insulator layer includes: forming an interlayer insulator layer. The forming the interlayer insulator layer includes: depositing one silicon nitride layer on the bridge layer after forming the bridge layer and before forming the electrode layer, and forming a first compact silicon nitride layer on a surface of the silicon nitride layer by performing annealing passivation treatment on the silicon nitride layer by using hydrogen plasmas. A remaining part of the silicon nitride layer is used as a first silicon nitride layer, and the first silicon nitride layer and the first compact silicon nitride layer constitute the interlayer insulator layer. After forming the first silicon nitride layer and the first compact silicon nitride layer, the method further includes: forming a via hole for connecting the bridge layer and the electrode layer by patterning the first silicon nitride layer and the first compact silicon nitride layer.

Optionally, in the above manufacturing method provided by the embodiment of the present disclosure, the forming the insulator layer includes: forming an interlayer insulator layer. The forming the interlayer insulator layer includes: depositing one silicon nitride layer on the electrode layer after forming the electrode layer and before forming the bridge layer, and forming a first compact silicon nitride layer on a surface of the silicon nitride layer by performing annealing passivation treatment on the silicon nitride layer by using hydrogen plasmas. A remaining part of the silicon nitride layer is used as a first silicon nitride layer, and the first silicon nitride layer and the first compact silicon nitride layer constitute the interlayer insulator layer. After forming the first silicon nitride layer and the first compact silicon nitride layer, the method further includes: forming an interlayer insulator layer pattern for isolating the bridge layer and a part of touch control electrodes in the electrode layer by patterning the first silicon nitride layer and the first compact silicon nitride layer.

Optionally, in the above manufacturing method provided by the embodiment of the present disclosure, the forming the insulator layer includes: forming a barrier layer.

The forming the barrier layer includes: depositing one silicon nitride layer on the substrate before forming the touch control structure, and forming a second compact silicon nitride layer on a surface of the silicon nitride layer by performing annealing passivation treatment on the silicon nitride layer by using hydrogen plasmas. A remaining part of the silicon nitride layer is used as a second silicon nitride layer, and the second silicon nitride layer and the second compact silicon nitride layer constitute the barrier layer.

DETAILED DESCRIPTION OF THE EMBODIMENTS

In order to make objectives, technical solutions and advantages of the present disclosure clearer, a touch panel and a manufacturing method thereof and a display apparatus provided by the present disclosure will be further described in detail below in combination with accompanying drawings. Obviously, the described embodiments are a part of embodiments of the present disclosure, rather than all the embodiments. Based on the embodiments of the present disclosure, all other embodiments obtained by those of ordinary skill in the art without creative efforts fall within the protection scope of the present disclosure.

Shapes and dimensions of components in the accompanying drawings do not reflect a real scale of the touch panel, and are only intended to illustrate the contents of the present disclosure.

Figure 1:
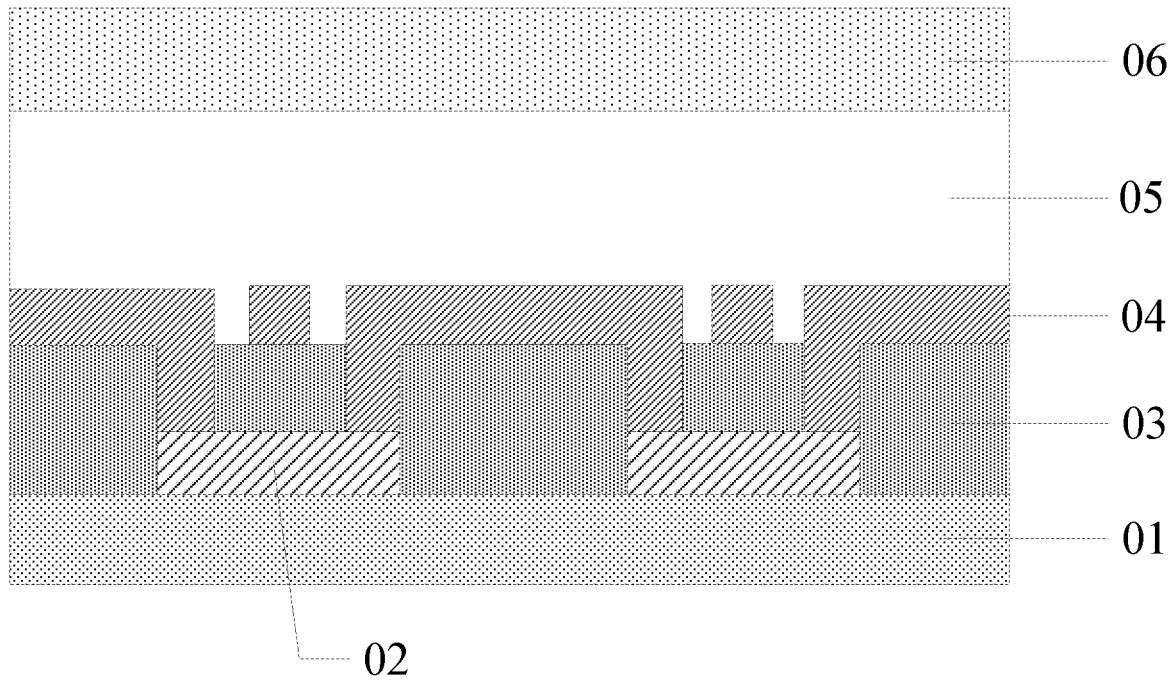
FIG. 1 is schematic structural diagram of a touch panel provided in the related art.

At present, as shown in FIG. 1, a touch panel in the related art basically adopts a touch control structure composed of a barrier layer (Barrier) 01, a bridge layer (Bridge) 02, an interlayer insulator layer (Insulator) 03, an electrode layer (Metal Mesh) 04 and a protective layer (OC) 05. The barrier layer 01 and the interlayer insulator layer 03 both adopt a SiNx thin film formed by a low temperature chemical vapor deposition (CVD) technology, and there may be residue of gases including nitrogen and ammonia gas in a formed SiNx thin film because the SiNx thin film is relatively poor in compactness. After a polarizer (POL) 06 is attached to the touch control structure in the related art, it is discovered in a reliability verification process that the POL severely fades. It is verified that a phenomenon of severe fading of the POL is mainly caused by the ammonia gas escaping from the SiNx thin film. Therefore, to prevent the POL from fading, those of skill in the art needs to find a technical solution for avoiding escape of the ammonia gas from the SiNx thin film.

Figure 2A:
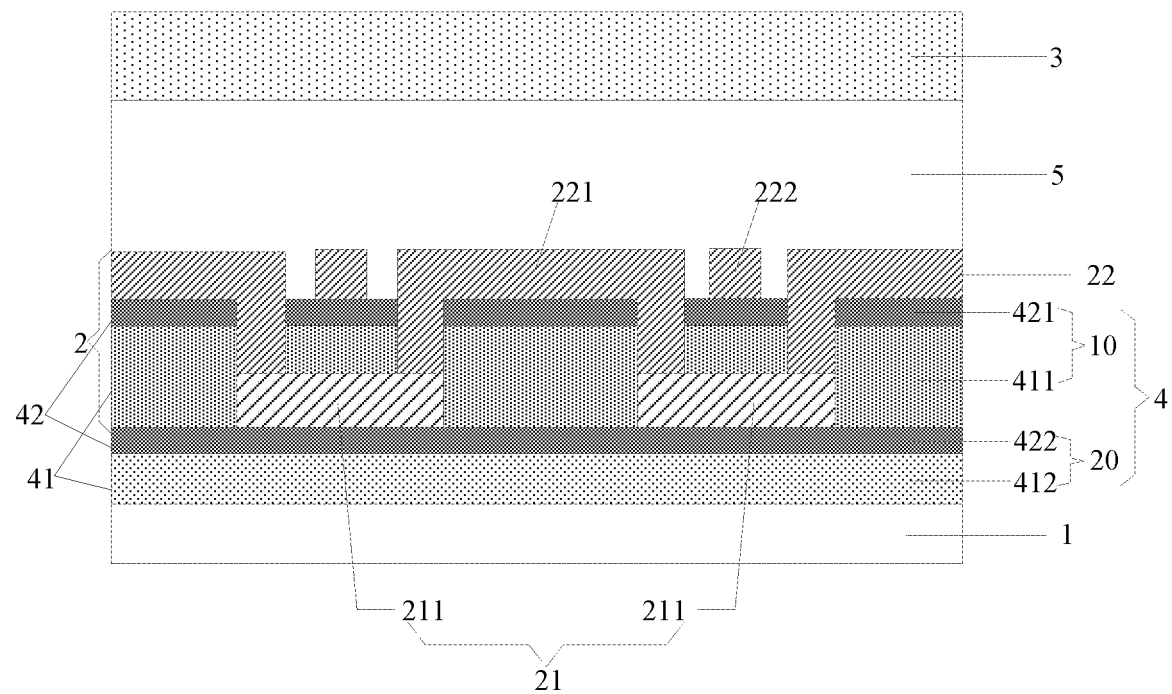
FIG. 2A and FIG. 2B are schematic structural diagrams of a touch panel provided by an embodiment of the present disclosure.
Figure 2B:
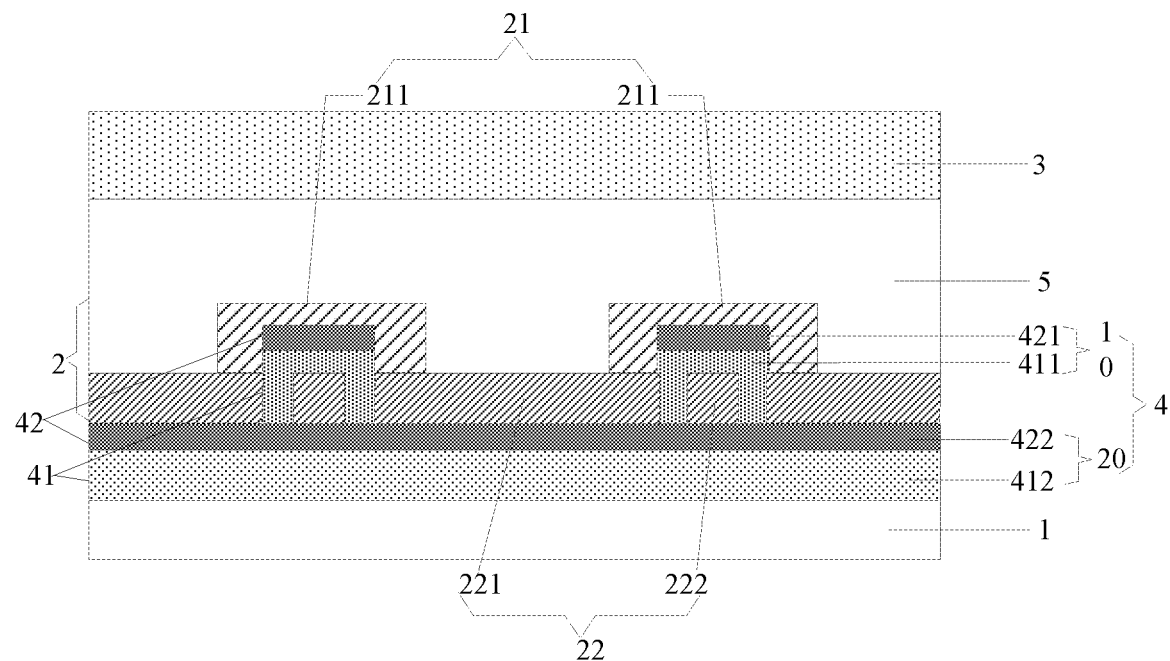

In view of this, a touch panel provided by an embodiment of the present disclosure, as shown in FIG. 2A and FIG. 2B, includes: a substrate 1, a touch control structure 2 and a polarizer 3 sequentially arranged on the substrate 1, and an insulator layer 4 arranged between the substrate 1 and the polarizer 3.

The insulator layer 4 includes a silicon nitride layer 41 and a blocking layer 42 on a side of the silicon nitride layer 41 away from the substrate 1.

According to the above touch panel provided by the embodiment of the present disclosure, the insulator layer 4 between the substrate 1 and the polarizer 3 is arranged to include the silicon nitride layer 41 and the blocking layer 42 on the side of the silicon nitride layer 41 away from the substrate 1. On the one hand, the blocking layer 42 may serve as a covering layer to prevent ammonia gas escaping from the silicon nitride layer 41 from flowing to the polarizer 3, therefore avoiding fading of the polarizer. On the other hand, the insulator layer 4 adopts a form of double thin films, namely the silicon nitride layer 41 and the blocking layer 42, the blocking layer 42 is formed on a surface of an existing insulator layer 4, and therefore, the silicon nitride layer 41 with a sufficient thickness is preserved on the basis of reducing an escaped amount of the ammonia gas, so the insulator layer 4 will not completely lose dielectric properties, optical properties and insulation properties in film layers of the touch panel. Moreover, since the insulator layer 4 is a composite insulator layer composed of the silicon nitride layer 41 and the blocking layer 42, a breakdown voltage of a circuit may be increased significantly.

Optionally, during specific implementation, in the above touch panel provided by the embodiment of the present disclosure, as shown in FIG. 2A and FIG. 2B, the silicon nitride layer 41 may include a first silicon nitride layer 411 and a second silicon nitride layer 412. Correspondingly, the blocking layer 42 may include: a first blocking layer 421 on a side of the first silicon nitride layer 411 away from the substrate 1 and a second blocking layer 422 on a side of the second silicon nitride layer 412 away from the substrate 1. The insulator layer 4 is arranged to include the first blocking layer 421 and the second blocking layer 422 arranged in a laminated mode, so that a dual effect of the two blocking layers may more effectively stop the ammonia gas escaped from the silicon nitride layer 41 from flowing to the polarizer, so the fading phenomenon of the polarizer is further avoided.

Optionally, during specific implementation, in the above touch panel provided by the embodiment of the present disclosure, as shown in FIG. 2A and FIG. 2B, the touch control structure 2 may include a bridge layer 21 and an electrode layer 22 arranged in a laminated mode, and an interlayer insulator layer 10 between the bridge layer 21 and the electrode layer 22; and the insulator layer 4 may include the interlayer insulator layer 10, and the interlayer insulator layer 10 is composed of the first silicon nitride layer 411 and the first blocking layer 421 which are arranged in contact with each other.

Further, during specific implementation, in the above touch panel provided by the embodiment of the present disclosure, as shown in FIG. 2A and FIG. 2B, the first blocking layer 421 may be a first silicon oxide layer, or the first blocking layer 421 may be a first compact silicon nitride layer.

In particular, when the first blocking layer 421 is the first silicon oxide layer, after manufacturing the interlayer insulator layer made of a material of silicon nitride, oxidation treatment is performed on a surface of the interlayer insulator layer by using oxygenated plasmas, and the first silicon oxide layer (i.e. the first blocking layer 421) is formed on the surface of the interlayer insulator layer. A remaining part of the silicon nitride layer is used as the first silicon nitride layer 411, and the first silicon nitride layer 411 and the first silicon oxide layer (i.e. the first blocking layer 421) constitute the interlayer insulator layer 10. Therefore, by arranging the interlayer insulator layer 10 between the bridge layer 21 and the electrode layer 22 including the first silicon oxide layer and the first blocking layer 421, the first silicon oxide layer is relatively compact and may serve as a covering layer to stop the ammonia gas escaped from the first silicon nitride layer 411 from flowing to the polarizer 3, so the fading phenomenon of the polarizer is avoided.

In particular, when the first blocking layer 421 is the first compact silicon nitride layer, after manufacturing the interlayer insulator layer made of the material of silicon nitride, annealing passivation treatment is performed on the interlayer insulator layer by using hydrogen plasmas. By using the hydrogen plasmas to perform annealing passivation treatment on the silicon nitride layer, a degree of order of a silicon nitride structure may be improved, i.e. compactness of the silicon nitride layer is improved, so the first compact silicon nitride layer (i.e. the first blocking layer 421) may be formed on a surface of the silicon nitride layer. The remaining part of the silicon nitride layer is used as the first silicon nitride layer 411, and the first silicon nitride layer 411 and the first compact silicon nitride layer (i.e. the first blocking layer 421) constitute the interlayer insulator layer 10. Therefore, by arranging the interlayer insulator layer 10 between the bridge layer 21 and the electrode layer 22 including the first compact silicon nitride layer and the first blocking layer 421, the first compact silicon nitride layer is relatively compact and may serve as a covering layer to stop the ammonia gas escaped from the first silicon nitride layer 411 from flowing to the polarizer 3, so the fading phenomenon of the polarizer is avoided.

The touch panel and a display panel are usually integrated to form a touch display apparatus. A general manufacturing method of a touch display apparatus is that, a display device is manufactured first on a substrate, the display device is then encapsulated (currently, TFE encapsulation is adopted more frequently), a barrier layer (Barrier) is further manufactured on a TFE encapsulation layer to further isolate external water vapor after encapsulation, a material of the barrier layer is usually silicon nitride, a touch control structure is then manufactured, and then processes of attaching a polarizer (POL) and encapsulating cover glass (Cover Glass) are performed. The barrier layer usually adopts a SiNx thin film formed by a low temperature chemical vapor deposition (CVD) technology. Because the SiNx thin film is relatively poor in compactness, there may be residue of gases, such as nitrogen and ammonia gas etc., in a formed SiNx thin film. Escape of the ammonia gas will cause a phenomenon of severe fading of the POL.

In view of this, optionally, during specific implementation, the above touch panel provided by the embodiment of the present disclosure, as shown in FIG. 2A and FIG. 2B, may further include a barrier layer 20 between the substrate 1 and the touch control structure 2, the insulator layer 4 may include the barrier layer 20, and the barrier layer 20 is composed of the second silicon nitride layer 412 and the second blocking layer 422 which are arranged in contact with each other.

In particular, in a structure shown in FIG. 2A and FIG. 2B provided by the embodiment of the present disclosure, although the interlayer insulator layer 10 is arranged to include the first silicon nitride layer 411 and the first silicon oxide layer (the first blocking layer 421) on the side of the first silicon nitride layer 411 away from the substrate 1. The first silicon oxide layer (the first blocking layer 421) may block the ammonia gas escaping from the first silicon nitride layer 411. A material of an existing barrier layer 20 is silicon nitride as well and ammonia gas will escape from the existing barrier layer 20 as well to cause fading of the polarizer 3. Therefore, in order to effectively prevent the polarizer 3 from fading, the present disclosure may further arrange the barrier layer 20 to include the second silicon nitride layer 412 and the second blocking layer 422 on the side of the second silicon nitride layer 412 away from the substrate 1.

Optionally, during specific implementation, in the above touch panel provided by the embodiment of the present disclosure, as shown in FIG. 2A and FIG. 2B, the second blocking layer 422 may be a second silicon oxide layer, or the second blocking layer 422 may be a second compact silicon nitride layer.

In particular, because a thin film of the second silicon oxide layer or the second compact silicon nitride layer is relatively compact and may serve as a covering layer to stop the ammonia gas escaping from the second silicon nitride layer 412 from flowing to the polarizer 3, the fading phenomenon of the polarizer is avoided. In particular, for implementation and principle of the second blocking layer 422 being the second silicon oxide layer or the second compact silicon nitride layer, reference may be made to implementation and principle of the first blocking layer 421 being the first silicon oxide layer or the first compact silicon nitride layer, which is not repeated here.

Optionally, during specific implementation, in order to ensure that the escaping amount of the ammonia gas can be reduced and the escaping ammonia gas can be prevented from flowing to the polarizer, as well as to ensure that properties of the remaining part of the first silicon nitride layer in the interlayer insulator layer are not affected, a thickness of the first blocking layer may occupy 10%-15% of a thickness of the interlayer insulator layer in the above touch panel provided by the embodiment of the present disclosure.

Optionally, during specific implementation, in order to ensure that the escaping amount of the ammonia gas can be reduced and the escaping ammonia gas can be prevented from flowing to the polarizer, as well as to ensure that properties of a remaining part of the second silicon nitride layer in the barrier layer are not affected, a thickness of the second blocking layer may occupy 10%45% of a thickness of the barrier layer in the above touch panel provided by the embodiment of the present disclosure.

Optionally, during specific implementation, the above touch panel provided by the embodiment of the present disclosure, as shown in FIG. 2A and FIG. 2B, may further include: a protective layer 5 between the touch control structure 2 and the polarizer 3.

In particular, a material of the protective layer 5 is usually an organic material. The protective layer 5 is, on the one hand, used as a planarization layer, and on the other hand, used to protect the electrode layer 22 from being affected by subsequent processes. The polarizer 3 is usually a circular polarizer. The polarizer 3 is used for a reason that because external light will be reflected back through an OLED cathode (usually metal), a user will see himself/herself from a screen and a viewing effect and a contrast ratio are affected. By attaching the polarizer 3, reflection may be reduced and a metal electrode is prevented from being seen.

It should be noted that, FIG. 2A provided by the embodiment of the present disclosure takes an example that the bridge layer 21 is on a side close to the substrate 1 and the electrode layer 22 is on a side away from the substrate 1. Of course, during specific implementation, as shown in FIG. 2B, the electrode layer 22 may be on the side close to the substrate 1 and the bridge layer 21 may be on the side away from the substrate 1, both of which belong to the protection scope of the present disclosure. The following description is made taking a structure shown in FIG. 2A as an example.

Optionally, during specific implementation, in the above touch panel provided by the embodiment of the present disclosure, as shown in FIG. 2A and FIG. 2B, the bridge layer 21 may include a plurality of bridge electrodes 211, the electrode layer 22 may include a plurality of touch control electrodes, and a part of the touch control electrodes are electrically connected through the bridge electrodes 211. In particular, the touch control electrodes usually include a plurality of touch control drive electrodes 221 and a plurality of touch control induction electrodes 222, and the touch control drive electrodes 221 and the touch control induction electrodes 222 are in an interesting and insulated mode inn the same layer. For example, in FIG. 2A, the touch control drive electrodes 221 are electrically connected with each other through the bridge electrodes 211 which are arranged on a layer different from a layer where the touch control drive electrodes 221 is located, and the touch control induction electrodes 222 are electrically connected with each other through the bridge electrodes which are arranged on the same layer as the touch control induction electrodes 222. Of course, the touch control induction electrodes 222 are electrically connected through the bridge electrodes which are arranged on a layer different from a layer where the touch control induction electrodes 222 is located, and the touch control drive electrodes 221 are electrically connected through the bridge electrodes which are arranged on the same layer as the touch control drive electrodes 221. No limitation is made here.

Based on the same inventive concept, an embodiment of the present disclosure further provides a manufacturing method of a touch panel, including the following. A touch control structure and a polarizer arranged in a laminated mode and an insulator layer arranged between a substrate and the polarizer are sequentially formed on the substrate. The forming the touch control structure includes forming a bridge layer and an electrode layer arranged in a laminated mode, and the forming the insulator layer includes forming a silicon nitride layer and a blocking layer on a side of the silicon nitride layer away from the substrate.

According to the above manufacturing method of the touch panel provided by the embodiment of the present disclosure, the insulator layer between the substrate and the polarizer is arranged to include the silicon nitride layer and the blocking layer on the side of the silicon nitride layer away from the substrate. On the one hand, the blocking layer may serve as a covering layer to prevent ammonia gas escaping from the silicon nitride layer from flowing to the polarizer, therefore avoiding fading of the polarizer. On the other hand, the insulator layer adopts a form of double thin films, namely the silicon nitride layer and the blocking layer, the blocking layer is formed in an existing insulator layer, and therefore, the silicon nitride layer with a sufficient thickness is preserved on the basis of reducing an escaped amount of the ammonia gas, so the insulator layer will not completely lose dielectric properties, optical properties and insulation properties in film layers of the touch panel. Moreover, since the insulator layer is a composite insulator layer composed of the silicon nitride layer and the blocking layer, a breakdown voltage of a circuit may be increased significantly.

Optionally, during specific implementation, in the above manufacturing method provided by the embodiment of the present disclosure, the forming the insulator layer includes: an interlayer insulator layer is formed.

The forming the interlayer insulator layer may include the following. One silicon nitride layer is deposited on the bridge layer after forming the bridge layer and before forming the electrode layer, oxidation treatment is performed on a surface of the silicon nitride layer by using oxygenated plasmas, a first silicon oxide layer is formed on the surface of the silicon nitride layer, a remaining part of the silicon nitride layer is used as a first silicon nitride layer, and the first silicon nitride layer and the first silicon oxide layer constitute the interlayer insulator layer. In particular, for implementation principle of the interlayer insulator layer including the first silicon nitride layer and the first silicon oxide layer, reference may be made to relevant description of FIG. 2A in the touch panel provided by the present disclosure, which is not repeated here.

Correspondingly, during specific implementation, in the above manufacturing method provided by the embodiment of the present disclosure, after forming the first silicon nitride layer and the first silicon oxide layer (by using an oxygenated plasma technology), the method may further include the following. the first silicon nitride layer and the first silicon oxide layer is patterned to form a via hole for connecting the bridge layer and the electrode layer. In particular, because after manufacturing the interlayer insulator layer, the electrode layer (for example, a touch control drive electrode or a touch control induction electrode) manufacturing on the interlayer insulator layer needs to be electrically connected to a bridge electrode of the bridge layer through a via hole penetrating the insulator layer, patterning needs to be performed on the first silicon nitride layer and the first silicon oxide layer after forming the first silicon nitride layer and the first silicon oxide layer, so as to form the via hole for connecting the bridge layer and the electrode layer. In the implementation, after the oxygenated plasmas are used to perform oxidation treatment on the surface of the insulator layer, patterning is then performed to form the via hole for connecting the bridge layer and the electrode layer.

Alternatively, optionally, during specific implementation, in the above manufacturing method provided by the embodiment of the present disclosure, the forming the insulator layer includes: the interlayer insulator layer is formed.

The forming the interlayer insulator layer may include the following. One silicon nitride layer is formed on the electrode layer after forming the electrode layer and before forming the bridge layer, oxidation treatment is performed on the surface of the silicon nitride layer by using the oxygenated plasmas, the first silicon oxide layer is formed on the surface of the silicon nitride layer, the remaining part of the silicon nitride layer is used as the first silicon nitride layer, and the first silicon nitride layer and the first silicon oxide layer constitute the interlayer insulator layer. In particular, for implementation principle of the interlayer insulator layer including the first silicon nitride layer and the first silicon oxide layer, reference may be made to relevant description of FIG. 2B in the touch panel provided by the present disclosure, which is not repeated here.

Correspondingly, during specific implementation, in the above manufacturing method provided by the embodiment of the present disclosure, after forming the first silicon nitride layer and the first silicon oxide layer (by using the oxygenated plasma technology), the method may further include the following.

Patterning is performed on the first silicon nitride layer and the first silicon oxide layer to form an interlayer insulator layer pattern for isolating the bridge layer and a part of touch control electrodes in the electrode layer. In particular, because after manufacturing the interlayer insulator layer, a situation that an connecting layer manufactured on the interlayer insulator layer is conducted to the touch control electrodes on a lower side needs to be avoided and needs to expose bridged touch control electrodes, patterning needs to be performed on the first silicon nitride layer and the first silicon oxide layer after forming the first silicon nitride layer and the first silicon oxide layer, so as to form the interlayer insulator layer pattern for isolating the bridge layer and a part of touch control electrodes in the electrode layer. In the implementation, after the oxygenated plasmas are used to perform oxidation treatment on the surface of the insulator layer, patterning is then performed to form the interlayer insulator layer pattern for isolating the bridge layer and a part of touch control electrodes in the electrode layer.

Alternatively, optionally, during specific implementation, in the above manufacturing method provided by the embodiment of the present disclosure, the forming the insulator layer includes: the interlayer insulator layer is formed.

The forming the interlayer insulator layer includes the following. One silicon nitride layer is deposited on the bridge layer after forming the bridge layer and before forming the electrode layer, annealing passivation treatment may be performed on the silicon nitride layer by using hydrogen plasmas, a first compact silicon nitride layer is formed on the surface of the silicon nitride layer, the remaining part of the silicon nitride layer is used as the first silicon nitride layer, and the first silicon nitride layer and the first compact silicon nitride layer constitute the interlayer insulator layer. In particular, by using the hydrogen plasmas to perform annealing passivation treatment on the silicon nitride layer, a degree of order of a silicon nitride structure may be improved, i.e. compactness of the surface of the silicon nitride layer is improved.

Correspondingly, during specific implementation, in the above manufacturing method provided by the embodiment of the present disclosure, after forming the first silicon nitride layer and the first compact silicon nitride layer (by using a hydrogen plasma annealing technology), the method may further include the following. Patterning is performed on the first silicon nitride layer and the first compact silicon nitride layer to form the via hole for connecting the bridge layer and the electrode layer. In particular, because after manufacturing the interlayer insulator layer, the electrode layer (for example, the touch control drive electrode or the touch control induction electrode) manufacturing on the interlayer insulator layer needs to be electrically connected to the bridge electrode of the bridge layer through the via hole penetrating the insulator layer, patterning needs to be performed on the first silicon nitride layer and the first silicon oxide layer after forming the first silicon nitride layer and the first silicon oxide layer, so as to form the via hole for connecting the bridge layer and the electrode layer. In the implementation, after the oxygenated plasmas are used to perform oxidation treatment on the surface of the insulator layer, patterning is then performed to form the via hole for connecting the bridge layer and the electrode layer.

Alternatively, optionally, during specific implementation, in the above manufacturing method provided by the embodiment of the present disclosure, the forming the insulator layer includes: the interlayer insulator layer is formed.

The forming the interlayer insulator layer includes the following. One silicon nitride layer is formed on the electrode layer after forming the electrode layer and before forming the bridge layer, annealing passivation treatment may be performed on the silicon nitride layer by using hydrogen plasmas, the first compact silicon nitride layer is formed on the surface of the silicon nitride layer, the remaining part of the silicon nitride layer is used as the first silicon nitride layer, and the first silicon nitride layer and the first compact silicon nitride layer constitute the interlayer insulator layer. In particular, by using the hydrogen plasmas to perform annealing passivation treatment on the silicon nitride layer, the degree of order of the silicon nitride structure may be improved, i.e. the compactness of the surface of the silicon nitride layer is improved.

Correspondingly, during specific implementation, in the above manufacturing method provided by the embodiment of the present disclosure, after forming the first silicon nitride layer and the first compact silicon nitride layer (by using the hydrogen plasma annealing technology), the method may further include the following. Patterning is performed on the first silicon nitride layer and the first compact silicon nitride layer to form the interlayer insulator layer pattern for isolating the bridge layer and a part of touch control electrodes in the electrode layer. In particular, because after manufacturing the interlayer insulator layer, the situation that the connecting layer manufactured on the interlayer insulator layer is conducted to the touch control electrodes on the lower side needs to be avoided and needs to expose the bridged touch control electrodes, patterning needs to be performed on the first silicon nitride layer and the first silicon oxide layer after forming the first silicon nitride layer and the first silicon oxide layer, so as to form the interlayer insulator layer pattern for isolating the bridge layer and a part of touch control electrodes in the electrode layer. In the implementation, after the oxygenated plasmas are used to perform oxidation treatment on the surface of the insulator layer, patterning is then performed to form the interlayer insulator layer pattern for isolating the bridge layer and a part of touch control electrodes in the electrode layer.

Optionally, during specific implementation, in the above manufacturing method provided by the embodiment of the present disclosure, the forming the insulator layer includes: a barrier layer is formed.

The forming the barrier layer includes the following. One silicon nitride layer is deposited on the substrate before forming the touch control structure, oxidation treatment is performed on the surface of the silicon nitride layer by using the oxygenated plasmas, a second silicon oxide layer is formed on the surface of the silicon nitride layer, the remaining part of the silicon nitride layer is used as a second silicon nitride layer, and the second silicon nitride layer and the second silicon oxide layer constitute the barrier layer. In particular, for implementation passivation principle of the barrier layer including the second silicon nitride layer and the second silicon oxide layer, reference may be made to relevant description of FIG. 2A and FIG. 2B in the touch panel provided by the present disclosure, which is not repeated here.

Alternatively, optionally, during specific implementation, in the above manufacturing method provided by the embodiment of the present disclosure, the forming the insulator layer includes: the barrier layer is formed.

The forming the barrier layer includes the following. One silicon nitride layer is deposited on the substrate before forming the touch control structure, annealing passivation treatment may be performed on the silicon nitride layer by using the hydrogen plasmas, a second compact silicon nitride layer is formed on the surface of the silicon nitride layer, the remaining part of the silicon nitride layer is used as the second silicon nitride layer, and the second silicon nitride layer and the second compact silicon nitride layer constitute the barrier layer. In particular, by using the hydrogen plasmas to perform annealing passivation treatment on the silicon nitride layer, the degree of order of the silicon nitride structure may be improved, i.e. the compactness of the surface of the silicon nitride layer is improved.

In conclusion, in the above manufacturing method provided by the embodiment of the present disclosure, by using the oxygenated plasmas to perform oxidation treatment of the surfaces of the interlayer insulator layer and the barrier layer, or using the hydrogen plasmas to perform annealing passivation treatment on the interlayer insulator layer and the barrier layer, an escaped amount of ammonia gas in the silicon nitride layer may be reduced more effectively and the escaped ammonia gas may be blocked, so fading of the polarizer is avoided more effectively.

Detailed description of the manufacturing method of the touch panel shown in FIG. 2A provided by the embodiment of the present disclosure will be made below in combination with the manufacturing method provided by the present disclosure. The description is made by taking the oxygenated plasmas treatment technology as an example.

Figure 3A:
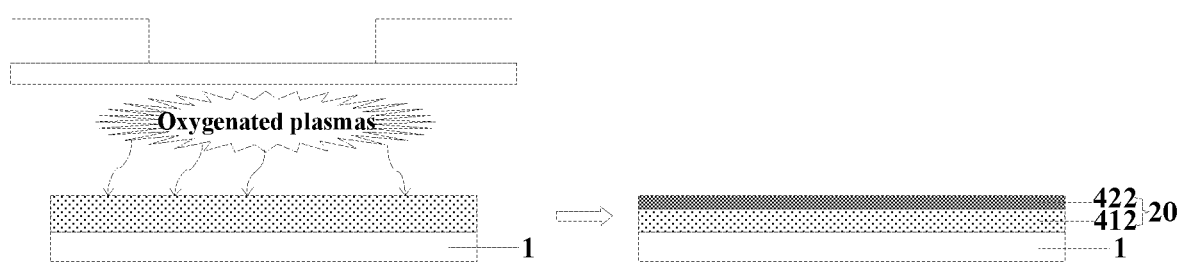
FIGS. 3A to 3F are schematic structural diagrams of a manufacturing method of a touch panel provided by an embodiment of the present disclosure after executing different steps.

(1) One silicon nitride layer is deposited on the substrate 1 by using a CVD technology, the oxygenated plasmas are used to perform oxidation treatment on the surface of the silicon nitride layer, the second silicon oxide layer 422 is formed on the surface of the silicon nitride layer, the remaining part of the silicon nitride layer is used as the second silicon nitride layer 412, and the second silicon nitride layer 412 and the second silicon oxide layer 422 constitute the barrier layer 20, as shown in FIG. 3A.

Figure 3B:
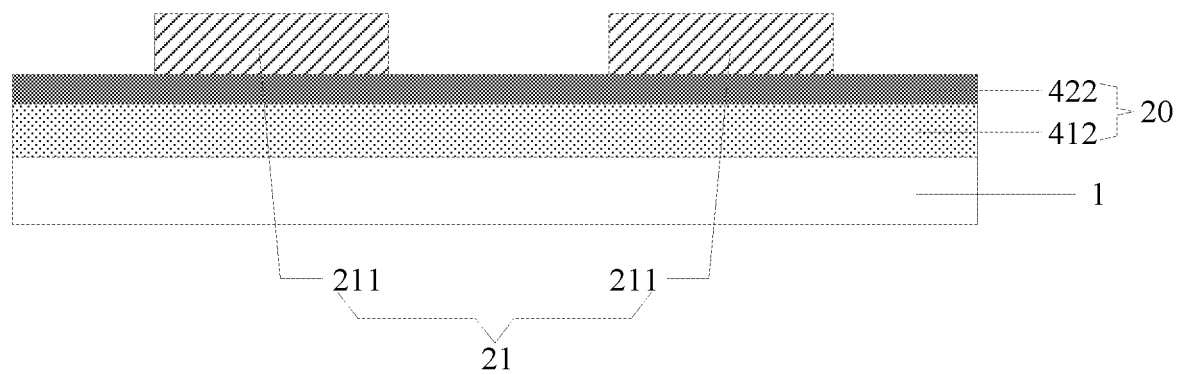

(2) One metal layer is deposited on the basis of step (1), and the metal layer is subjected to patterning through a photoetching process to form the bridge electrode 211, and a plurality of bridge electrodes 211 form the bridge layer 21, as shown in FIG. 3B.

Figure 3C:
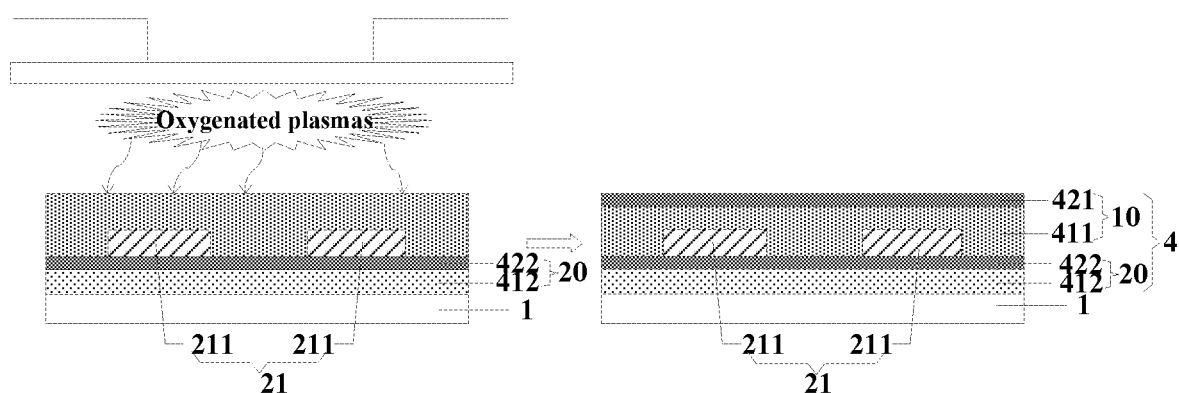

(3) One silicon nitride layer is deposited on the basis of step (2) by using the CVD technology, the oxygenated plasmas are used to perform oxidation treatment on the surface of the silicon nitride layer, the first silicon oxide layer 421 is formed on the surface of the silicon nitride layer, the remaining part of the silicon nitride layer is used as the first silicon nitride layer 411, and the first silicon nitride layer 411 and the first silicon oxide layer 421 constitute the interlayer insulator layer 10, as shown in FIG. 3C.

Figure 3D:
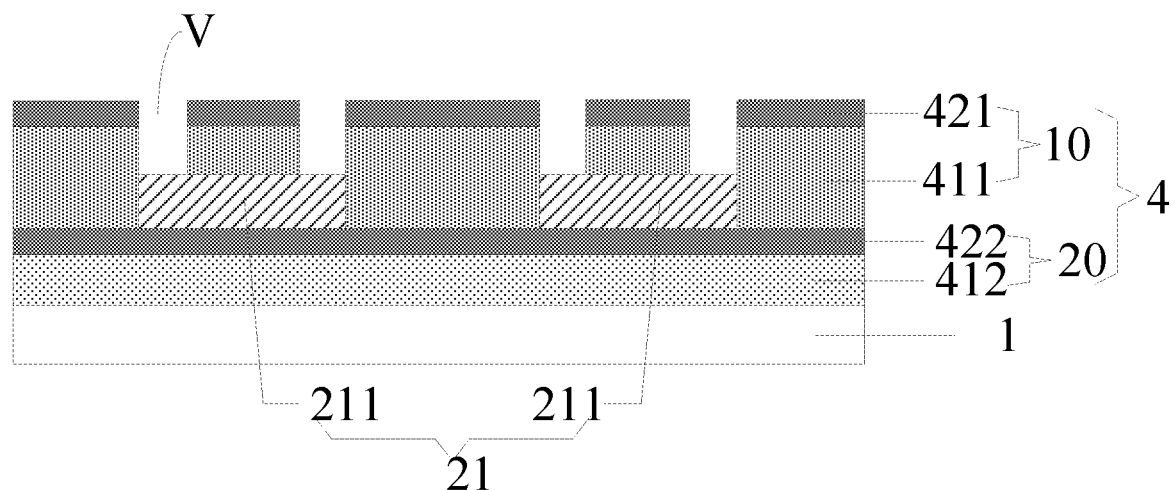

(4) Patterning is performed on the interlayer insulator layer 10 in step (3) by using a patterning technology, and the via holes V are formed in the interlayer insulator layer 10, as shown in FIG. 3D.

Figure 3E:
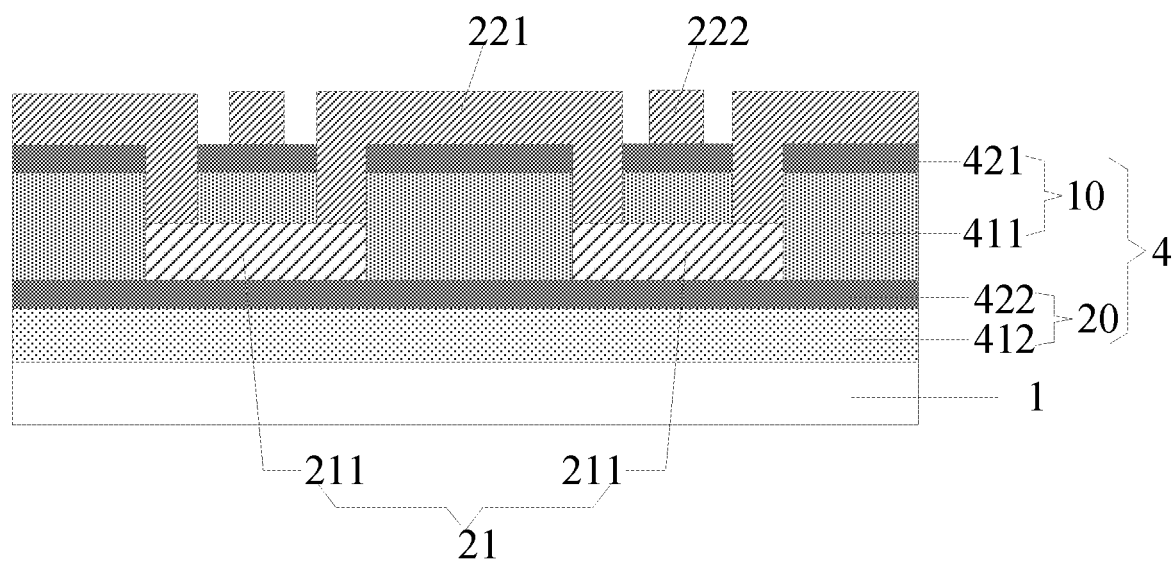

(5) One electrode layer which may be a metal material or may be a transparent conductive material is deposited on the basis of step (4), and the touch control electrodes (the touch control drive electrodes 221 and the touch control induction electrodes 222) are etched in the electrode layer through the patterning technology, and the touch control drive electrodes 221 are electrically connected with the bridge electrodes 211 through the via holes V, as shown in FIG. 3E.

Figure 3F:
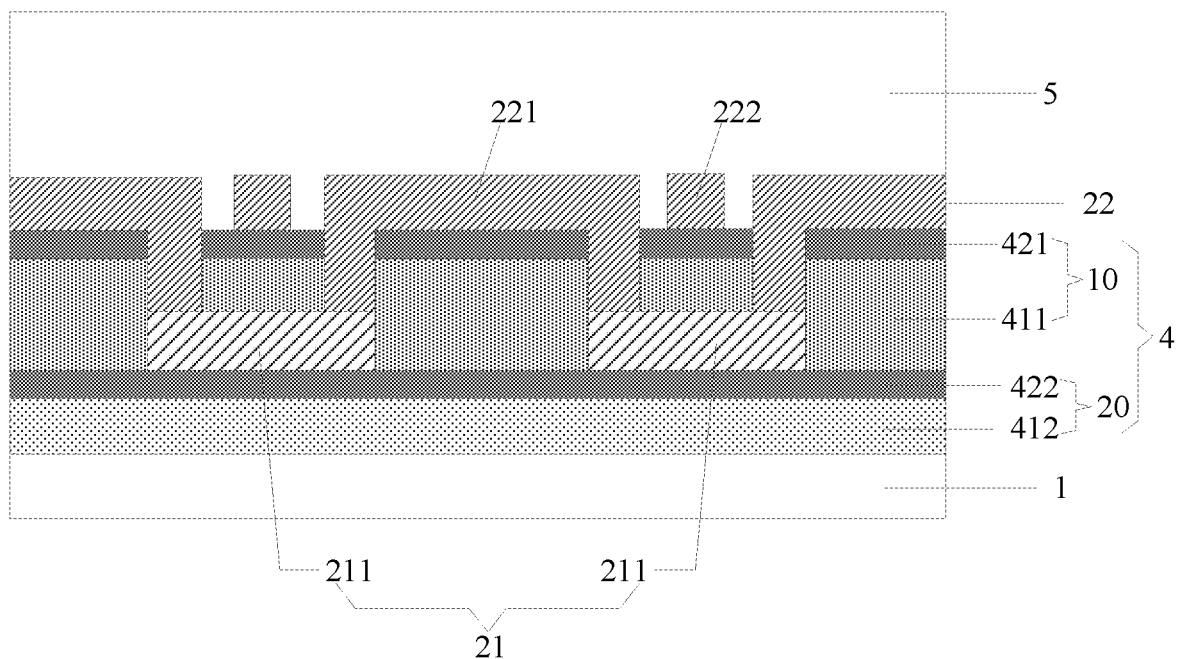

(6) An organic material is deposited on the basis of step (5) to form a protective layer 5, as shown in FIG. 3F.

(7) The polarizer 3 is bonded to a touch panel in step (6) to form the touch panel shown in FIG. 2A of the embodiment of the present disclosure.

It should be noted that, in the embodiment of the present disclosure, the detailed manufacturing method of a structure shown in FIG. 2A is described by taking the process of using the oxygenated plasmas to perform oxidation treatment on the surfaces of the interlayer insulator layer and the barrier layer as an example. Of course, during specific implementation, the manufacturing method of the structure shown in FIG. 2A based on the process of using the hydrogen plasmas to perform annealing passivation treatment on the interlayer insulator layer and the barrier layer is the same as that of a structure shown in FIG. 3A to FIG. 3F above, except for one difference in that the first blocking layer 421 is the first compact silicon nitride layer and the second blocking layer 422 is the second compact silicon nitride layer, which is not described in detail here.

Based on the same inventive concept, an embodiment of the present disclosure further provides a display apparatus, including the touch panel provided by the embodiment of the present disclosure. The display apparatus may be: a mobile phone, a tablet computer, a television, a display, a notebook computer, a digital photo frame, a navigator, or any other product or component with a display function. For implementation of the display apparatus, reference may be made to the embodiment of the above touch panel, and repetition is not made here.

Figure 4:
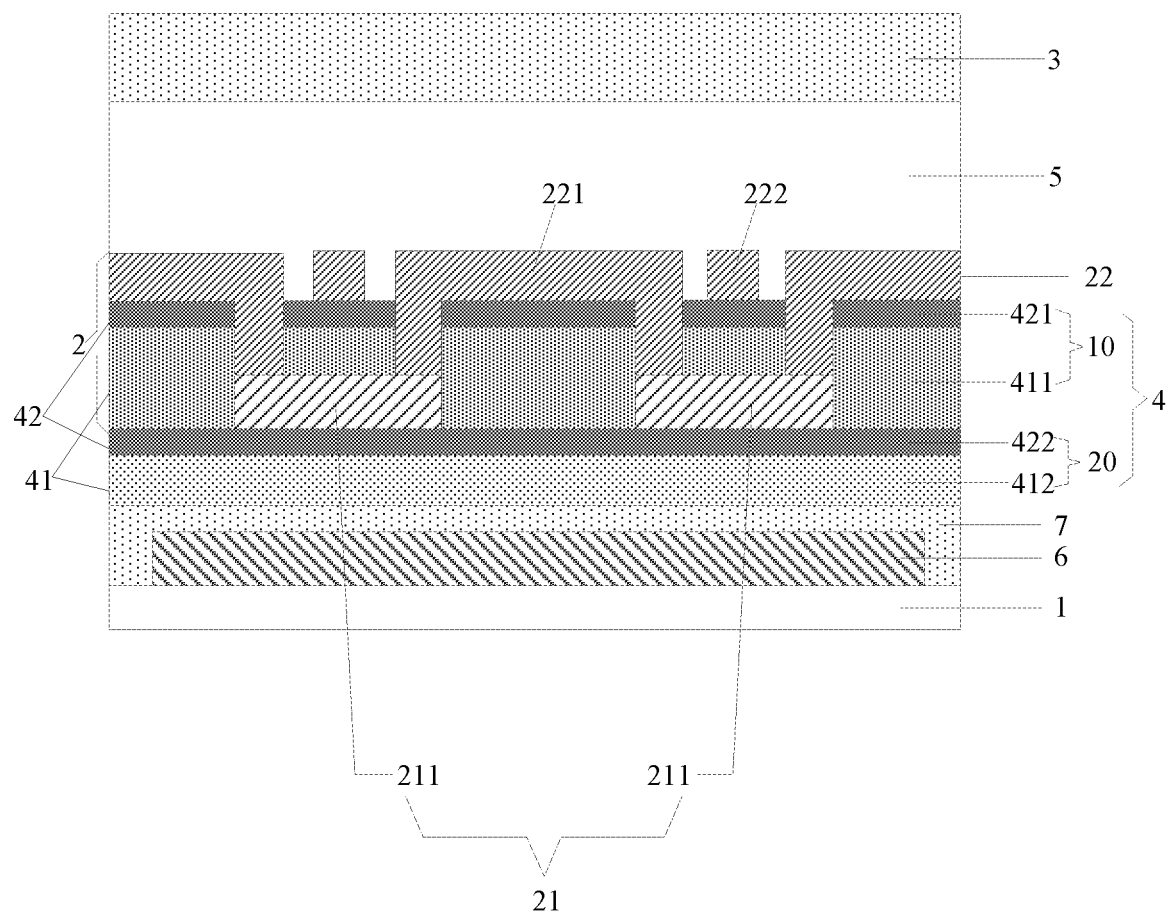
FIG. 4 is a schematic structural diagram of a display apparatus provided by an embodiment of the present disclosure.

In particular, in the above display apparatus provided by the embodiment of the present disclosure, as shown in FIG. 4, a display device 6 may be arranged between a barrier layer 20 and a substrate 1. In particular, the display device 6 may be first manufactured on the substrate 1, and TFE encapsulation 7 is then adopted on the display device 6, and then the barrier layer 20 is manufactured.

According to the above touch panel and the manufacturing method thereof, and the display apparatus provided by the embodiments of the present disclosure, the insulator layer between the substrate and the polarizer is arranged to include the silicon nitride layer and the blocking layer on the side of the silicon nitride layer away from the substrate. On the one hand, the blocking layer may serve as a covering layer to prevent ammonia gas escaping from the silicon nitride layer from flowing to the polarizer, therefore avoiding a fading phenomenon of the polarizer. On the other hand, the insulator layer adopts a form of double thin films, namely the silicon nitride layer and the blocking layer, the blocking layer is formed in an existing insulator layer, and therefore, the silicon nitride layer with a sufficient thickness is preserved on the basis of reducing an escaped amount of the ammonia gas, so the insulator layer will not completely lose dielectric properties, optical properties and insulation properties in film layers of the touch panel. Moreover, since the insulator layer is a composite insulator layer composed of the silicon nitride layer and the blocking layer, a breakdown voltage of a circuit may be increased significantly.

Obviously, those of skill in the art can make various changes and modifications to the present disclosure without departing from the spirit and scope of the present disclosure. Thus, provided that these changes and modifications of the present disclosure fall within the scope of the claims of the present disclosure and their equivalents, the present disclosure is also intended to cover such changes and modifications.

What is claimed is:

1. A touch panel, comprising:
   a substrate;
   a first silicon nitride layer on a side of the substrate;
   a first blocking layer on a side of the first silicon nitride layer away from the substrate, wherein the first blocking layer is a first silicon oxide layer or a first compact silicon nitride layer; and
   a bridge layer on a side of the first blocking layer away from the substrate, wherein the bridge layer includes a plurality of bridge electrodes and is made of metal; a second silicon nitride layer on a side of the bridge layer away from the substrate; a second blocking layer on a side of the second silicon nitride layer away from the substrate, wherein the second blocking layer is a second silicon oxide layer or a second compact silicon nitride layer, the second silicon nitride layer and the second blocking layer constitute an interlayer insulator layer, and the interlayer insulator layer is provided with at least one via hole; an electrode layer on a side of the second blocking layer, wherein the electrode layer comprises a plurality of touch control drive electrodes and a plurality of touch control induction electrodes, and the plurality of touch control drive electrodes or the plurality of touch control induction electrodes are electrically connected to the plurality of bridge electrodes through the at least one via hole; or
   an electrode layer on a side of the first blocking layer away from the substrate, wherein the electrode layer comprises a plurality of touch control drive electrodes and a plurality of touch control induction electrodes; a second silicon nitride layer on a side of the electrode layer away from the substrate; a second blocking layer on a side of the second silicon nitride layer away from the substrate, wherein the second blocking layer is a second silicon oxide layer or a second compact silicon nitride layer, the second silicon nitride layer and the second blocking layer constitute an interlayer insulator layer, and the interlayer insulator layer is provided with at least one via hole; a bridge layer on a side of the second blocking layer away from the substrate, wherein the bridge layer includes a plurality of bridge electrodes and is made of metal, and the plurality of touch control drive electrodes or the plurality of touch control induction electrodes are electrically connected to the plurality of bridge electrodes through the at least one via hole.

2. The touch panel according to claim 1 wherein a thickness of the second blocking layer occupies 10% to 15% of a thickness of the interlayer insulator layer.

3. The touch panel according to claim 1, wherein a thickness of the first blocking layer occupies 10% to 15% of a thickness of the barrier layer.

4. The touch panel according to claim 1, further comprising: a protective layer on a side of the electrode layer, which is on a side of the second blocking layer away from the substrate, away from the substrate, and a polarizer on a side of the protective layer away from the substrate; or
   a protective layer on a side of the bridge layer, which is on a side of the second blocking layer away from the substrate, away from the substrate, and a polarizer on a side of the protective layer away from the substrate.

5. A display apparatus, comprising the touch panel according to claim 1.

6. A manufacturing method of a touch panel, comprising:
   forming, on a substrate, sequentially a first silicon nitride layer and a first blocking layer on a side of the first silicon nitride layer away from the substrate, wherein the first blocking layer is a first silicon oxide layer or a first compact silicon nitride layer;
   wherein the method further comprises:
   forming a bridge layer, a second silicon nitride layer, a second blocking layer, an electrode layer sequentially on the first blocking layer; wherein the bridge layer includes a plurality of bridge electrodes and is made of metal, the second blocking layer is a second silicon oxide layer or a second compact silicon nitride layer, the second silicon nitride layer and the second blocking layer constitute an interlayer insulator layer, the interlayer insulator layer is provided with at least one via hole, the electrode layer comprises a plurality of touch control drive electrodes and a plurality of touch control induction electrodes, and the plurality of touch control drive electrodes or the plurality of touch control induction electrodes are electrically connected to the plurality of bridge electrodes through the at least one via hole; or forming an electrode layer, a second silicon nitride layer, a second blocking layer and a bridge layer sequentially on the first blocking layer; wherein the electrode layer comprises a plurality of touch control drive electrodes and a plurality of touch control induction electrodes, the second blocking layer is a second silicon oxide layer or a second compact silicon nitride layer, the second silicon nitride layer and the second blocking layer constitute an interlayer insulator layer, and the interlayer insulator layer is provided with at least one via hole, the bridge layer includes a plurality of bridge electrodes and is made of metal, and the plurality of touch control drive electrodes or the plurality of touch control induction electrodes are electrically connected to the plurality of bridge electrodes through the at least one via hole.

* * * * *